United States Patent Office 2,711,951
Patented June 28, 1955

2,711,951
PROCESS FOR PRODUCING A BRIQUETTE OF IRON ORE

Howard F. West, Joliet, and John H. Veale, Coal City, Ill., assignors to Illinois Clay Products Company, Joliet, Ill., a corporation of Illinois No Drawing. Application August 2, 1951, Serial No. 240,064

1 Claim. (Cl. 75—3)

This invention relates to improvements in blast furnace operation.

According to the invention the operation of blast furnaces is improved by use of ore in powdered or finely granular condition intimately mixed and bonded with carbon in a similar fine state of subdivision. The ore is reduced efficiently without loss in the form of dust, and there is neither loss of carbon in the form of dust nor burning of the coke without opportunity to exercise its reducing function.

The further nature and details of the invention will readily appear from the following description of one embodiment of the invention.

Increase in production and operating efficiency of the blast furnace is very important because production of the blast furnace largely determines the capacity of the iron and steel industry. To avoid loss and reduction of capacity through dust in the form of fine ore, carbon and limestone, it is the practice to minimize the amount of fine material in the charge by limiting the charge so far as possible to coarse pieces of ore, coke, and limestone. While this minimizes loss on account of dust, it results in reduction of efficiency of operation due to lack of intimacy of association or contact of ore and coke which is essential for an efficient reduction of the ore. Moreover the highly porous condition of the charge causes burning of a substantial amount of the coke by the air blast directly into $CO_2$ before it is able to exert any reducing action on the ore.

We have been able greatly to improve blast furnace operation by intimately associating the ore and carbon without dust loss, by using ore and carbon in a powdered or finely divided state, intimately mixed together so that they will react efficiently, and bonded together to hold the materials against being blown out as dust as they would otherwise be. Various forms of carbon may be used, e. g., metallurgical coke (e. g., coke breeze), petroleum coke, anthracite, charcoal, etc. Coke breeze is preferred because of its low cost. Both the iron ore and coke (as coke breeze) are available in enormous quantities in a fine or powdered condition. This includes not only the natural ore itself as mined or screened from coarser ore, but concentrates from taconite rock and blast furnace dust. The latter comprises both powdered iron ore and finely divided coke. Indeed the coke is present in a proportion greater than necessary for reducing. Finely divided iron ore is so plentiful as to create a problem in utilization, and the present invention goes far toward solving that problem.

Where powdered iron ore or tactonite concentrate is used, about 15% of carbon (e. g., coke breeze) is mixed with the ore. Preferably the coke breeze is screened to exclude particles larger than one quarter inch mesh.

The mixture is molded and advantageously bonded with iron sulphate. The iron sulphate bonding agent may be provided either by using spent pickle liquor (iron sulphate solution with some free acid) or a small amount (about 3%) of concentrated sulphuric acid with only enough water to make a workable mixture. This produces an effective, inexpensive bond. If pickle liquor be used, it is added in such a quantity as to provide an equivalent amount of iron sulphate bonding agent as that formed by 3% concentrated sulphuric acid. Whether sulphuric acid or spent pickle liquor is used, depends largely on availability of spent pickle liquor at low cost at the point of formation of the brick. The mixture may advantageously be dry pressed. This minimizes the amount of water necessary to make a workable mixture. If additional silica and alumina be not objectionable, a small amount of plastic fire clay or bentonite may be added to improve the workability of the mixture. Other bonding agents may be used, but the illustrative bond seems to be the cheapest and the most effective.

Dry pressing in a brick press provides a dense brick of a size (e. g., 2" x 2" x 4") that is ideal for use in blast furnaces. However, the mixture may be formed in any other desired shapes and also by other means of forming, such as by extrusion. For convenience, the term brick will be used in a generic sense to designate the product regardless of its size, shape or method of formation.

After forming, the brick are preferably heated to remove excess moisture and to complete the bond. For this purpose temperatures may be carried as high as 400° F. Heating to about 380° F. improves the water resistance of the brick although the same strength (a modulus of rupture of about 500–600 lbs. per square inch) can be obtained at lower temperatures above 212° F.

The composite brick are charged into the blast furnace with limestone and sufficient additional coke (if such be necessary) to maintain proper operating conditions and to reduce any natural iron ore introduced with the charge as next explained. If desired, other ore may be added, but preferably this should be of relatively coarse character to maintain the "open" or highly porous character of the charge.

In the blast furnace, the exteriors of the brick are of course heated first to temperatures at which reduction takes place. Little of the coke in the brick is burned by the air to $CO_2$, first, because only the exposed exterior of the brick can be in contact with any free air, and second, because the more intimate association of the coke and iron ore particles insures there will be a preferential combination of the coke with the oxygen of the ore, thereby reducing it to metallic iron. The reducing action on the interior of the brick will be even more efficient since access to oxygen of the air is almost wholly cut off and reduction will take place as in a muffle furnace where oxygen of the air is excluded. The metallic iron will flow together as the ore is reduced, and at no time will either the coke or the iron be exposed to the blast in such form that it can be blown out as dust.

Although the ore and carbon are initially associated (in a relatively dense brick) to facilitate efficient reduction, the charge as a whole is porous and open and makes it possible easily to pass without substantial resistance, the substantial volumes of gases essential to maintain proper reducing temperatures and to control such temperatures. Reduction can therefore take place high in the charge of furnace, a condition necessary to efficient operation. Reduction is an endothermic reaction, and it is highly desirable that the absorption of heat incident to such reaction, occur high in the furnace so as not to remove heat from the lower portion of the furnace where it is important that very high temperatures exist.

The more efficient reduction thus obtained so accelerates the reducing operation as to increase the production of the blast furnace from 20% to 50%.

Before reducing temperatures are reached in the blast furnace, the sulphur in the charge including the sulphur of the iron sulphate bonding agent, will be driven off. Initially $SO_3$ will be liberated (at about 700° F.) but the CO (carbon monoxide) in the heating gases from the coke charge will exert a reducing action thereon, changing at least some of it to $SO_2$, and even to sulphur. The latter will volatilize at temperatures (about 832° F., depending on conditions) below those at which reduction of the ore takes place. Ordinarily, therefore, most of the sulphur will be driven off and will not be present to dissolve in the molten metallic iron resulting from reduction of the ore. Considerable control over the nature and sequence of the reactions which take place in the blast furnace, may be obtained by the manner of operation of the furnace, e. g., the manner and frequency of tapping off the pig iron and slag, the volume and variation of the volume of air injected into the furnace, the texture of the charge, etc. By these means also it is possible to insure substantial removal of the sulphur before reduction of the ore takes place.

While the iron sulphate bond decomposes, sufficient strength remains to maintain the integrity of the brick and prevent release of the ore or carbon as dust.

Summarizing: Iron ore in the fine condition in which it is already available is intimately associated with carbon (e. g., coke breeze) to make possible an efficient reduction. The ore and carbon are bonded together in sizes which are ideal for efficient handling and efficient blast furnace operation. This fine ore could not otherwise be reduced without expensive processing. The bonding agent, iron sulphate, is cheap and effective. The sulphur thus added to the ore is eliminated before reduction takes place, on destruction of the initial bond, and even the stronger bond is formed. Despite the fine nature of the ore and carbon in the brick, the charge as a whole is free and open, and reduction can therefore take place high in the furnace.

Obviously the invention is not limited to the details of the illustrative embodiments since these may be variously modified. Moreover, it is not indispensable that all features of the invention be used conjointly since various features may be used to advantage in different combinations and subcombinations.

Having described our invention we claim:

The method of making an iron ore charging brick which comprises the steps of mixing natural iron ore fines with a minor proportion of sulphuric acid, of pressing the mix into briquettes, and of then heating the briquettes to about 380° F. to form a water resistant brick bonded together with iron sulphate.

References Cited in the file of this patent

UNITED STATES PATENTS

| | | |
|---|---|---|
| 748,739 | Huffelmann | Jan. 5, 1904 |
| 800,698 | Wedge | Oct. 3, 1905 |
| 933,269 | Schumacher | Sept. 7, 1909 |
| 933,270 | Schumacher | Sept. 7, 1909 |
| 1,536,032 | Stillman | Apr. 28, 1925 |
| 2,373,244 | Holz | Apr. 10, 1945 |

FOREIGN PATENTS

| | | |
|---|---|---|
| 21,533 | Norway | July 3, 1911 |